Patented Mar. 23, 1937

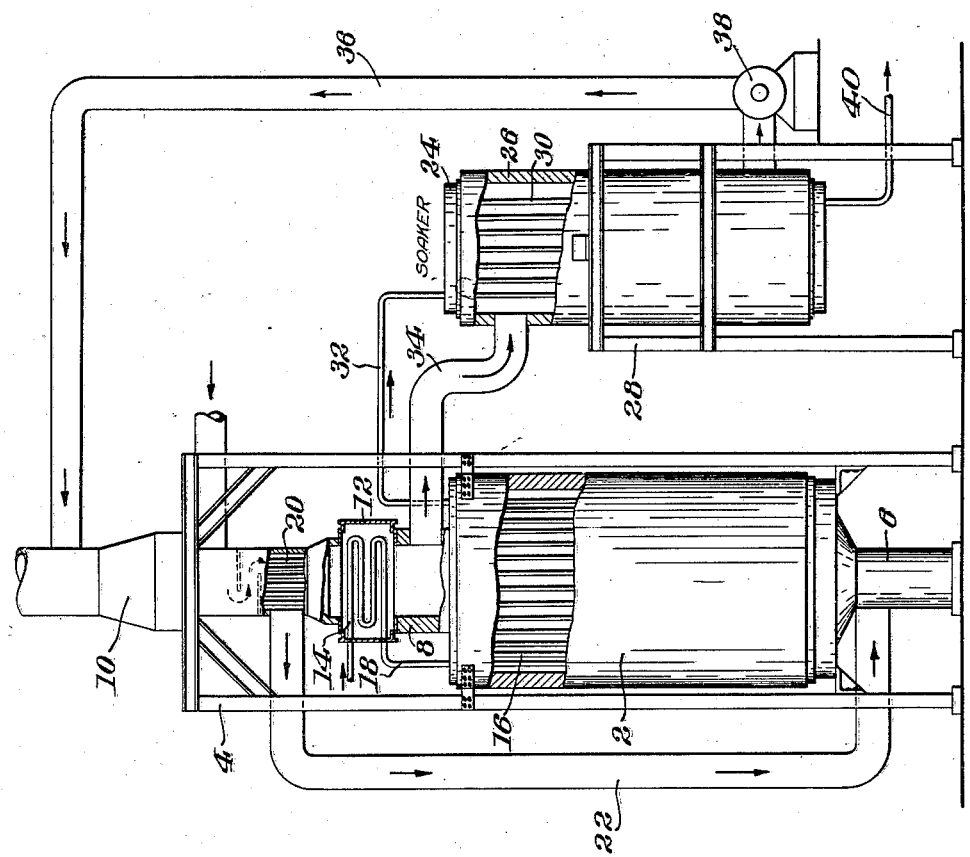

2,074,539

UNITED STATES PATENT OFFICE 2,074,539

TREATMENT OF HYDROCARBON OILS

Luis de Florez, Pomfret, Conn., assignor to The Texas Company, New York, N. Y., a corporation of Delaware Application July 25, 1931, Serial No. 553,025

2 Claims. (Cl. 196—116)

This invention relates to the heat treatment of hydrocarbon fluids particularly to improvements in process and apparatus whereby such a fluid is heated in tubular elements by radiant heat and then the temperature of the fluid maintained in a soaker section by heat transferred by convection.

In the heat treatment of hydrocarbon fluids it is advantageous to rapidly heat the fluid to the desired temperature and then maintain the hot fluid at this temperature for a certain period of time. In the prior art it has been customary to heat the fluid in a furnace wherein it is rapidly heated, at least in part, by radiant heat and then the hot material passed through sections which are swept by the flue gases to attain heat mainly by convection. Heretofore there has been difficulty in separating and shielding the soaking section of the apparatus from the radiant heat section and consequently, in order to avoid excessive rises in temperature, it has been customary to introduce portions of the cool unheated fluid into the soaking section to absorb the heat and control the temperature of the fluid therein.

In my prior patents, U. S. No. 1,717,334, June 11, 1929, and British No. 328,064, April 24, 1930, I have disclosed an apparatus wherein it is possible to successfully separate the radiant from the convection or preheater section of the furnace. The apparatus shown in the patents referred to is successful for the preheating of fluids which are to be charged to the main heater of the furnace and for economizing the heat of the flue gases.

In the present invention I have devised a soaker section in connection with a furnace, essentially of the type as referred to above, wherein the soaker section is not only in a convection zone entirely separate from the radiant heat zone but also means are provided for supplying a regulated amount of convection heat thereto. Therefore a given temperature in the soaker may be maintained without resort to the introduction of cool fluid or other means for absorbing excess heat as has been done heretofore.

The invention is applicable to the heating of any heat absorbing fluid in which it is desirable to apply heat rapidly to the fluid and then maintain the temperature over a period of time to allow a time factor for reactions to take place or for other purposes which may arise in the art. The invention, however, is especially adapted to the heat treatment of hydrocarbon oils to effect conversion thereof. Thus hydrocarbon oil may be rapidly raised to a cracking temperature in the high temperature or radiant heat zone and then the temperature thereof maintained in the soaker section in order to provide time for the conversion of the oil to take place.

The invention may be more clearly understood by reference to the accompanying drawing which shows a diagrammatical representation, particularly in section, of an apparatus forming an embodiment thereof.

In the drawing the reference character 2 represents a cylindrical combustion chamber set within a supporting frame-work 4. The combustion chamber is preferably of the type disclosed in U. S. Patent No. 1,717,334, June 11, 1929, and British No. 328,064, April 24, 1930, referred to heretofore. At the bottom of the combustion chamber is a fire box 6 while at the top and extending down into the combustion chamber is a flue 8, the upper end of which connects to a chimney or stack 10. Interposed horizontally or at right angles to the flue 8 is an economizer or preheater 12 having a coil 14 therein. Circularly arranged within the combustion chamber 2, adjacent the walls, are a plurality of connected parallel tubes 16 forming a heating coil which is connected to the preheater 14 by a connecting line 18.

The tubes 16 are arranged cylindrically around the walls of the combustion chamber 2 so that the hot products of combustion flowing up from the fire box 6 pass centrally of the tubes and substantially out of contact therewith. The heat transferred to the tubes is substantially entirely by radiation and by regulating the quantity of air so that approximately the theoretical quantity for complete combustion of the fuel is supplied an intense radiant heat is produced.

The combustion gases from the burning fuel in fire box 6 pass centrally of the tubes 16 in an unobstructed path to the flue 8. A portion of the flue gases is drawn through conduit 34 to the soaker 24 and then discharged through conduit 36 into the stack 10. The remainder of the flue gases in the stack 8 passes over the preheater coils 14 to heat the same by convection. The gases from the preheater 12 are then passed through the exchange section 20 to preheat the air. The air is preferably preheated by indirect contact with the hot flue gases in the exchanger 20 and the resulting hot air conducted through the conduit 22 to the fire box 6.

A feature of the present invention is the soaker 24 adjacent and outside the furnace. The soaker comprises an insulated chamber 26 supported by a frame-work 28. The chamber 28 is preferably cylindrical in form although other shapes and designs may be used. Arranged vertically within the chamber 36 is a soaking section or coil 30 consisting of a plurality of vertically interconnected tubes which are in communication with the tubes 16 of the heater section by a connecting line 32. The tubes 30 may be arranged adjacent the interior walls of the chamber 26 but are preferably distributed uniformly through the chamber in such a manner as to give maximum contact with the heating gases passing therethrough. The tubes 30 receive heat by convection from flue gases circulated therethrough from the furnace. A conduit 34 connects the top of the chamber 26 with the flue 8 and a conduit 36 connects the bottom of the chamber 26 with the stack 10. A fan 38 is located in the conduit 36 to circulate the regulated quantity of the flue gases through the soaker and around the tubes 30.

In heating hydrocarbon oils, for example with the apparatus shown, oil is conducted through the preheater 14 where it is raised to a temperature of about 200° F. to 500° F. by the flue gases from the combustion chamber of the furnace. The preheated oil is then transferred through line 18 to the tubes 16 of the heater. In the heater the oil in passing through the tubes travels in a plurality of vertical parallel paths along the walls of the furnace substantially equidistant from the flame. A flame of intensive radiant heat is directed centrally of the tubes but out of contact therewith so as to heat the oil substantially entirely by radiant heat which may be obtained by the use of approximately the theoretical quantity of preheated air from the conduit 22 for complete combustion of the fuel.

In the tubes 16 of the main heater the oil is rapidly raised to a conversion temperature of about 750° F. to 1250° F. The hot oil is then transferred through line 32 to the tubes 30 of the soaker 24. Tubes 30 are of sufficient length to provide a time factor for conversion. The time in passing through the tubes will vary with the pressure which influences the velocity and also on the length of the coil. A pressure of atmospheric to several hundred pounds may be maintained on the oil and the coil may be of the order of several thousand feet in length. The temperature of the oil in the soaker is preferably maintained at the temperature of the oil leaving the furnace; however, it may vary considerably therefrom. The temperature may be conveniently maintained by convective heat from the flue gases circulated from the furnace therethrough by conduits 34 and 36, although it is contemplated that additional heat may be supplied by a burner, if desired, or the heat regulated by the flue gases. The quantity of flue gases may be conveniently controlled by the fan or blower 38.

The converted products from the soaker 24, the character of which depends on whether conversion takes place in liquid or vapor phase, are discharged therefrom through the line 40 to suitable apparatus, for further treatment, such as a vaporizer, fractionator or coke stills.

Obviously many modifications and variations of the invention, as hereinbefore set forth, may be made without departing from the spirit and scope thereof, and therefore only such limitations should be imposed as are indicated in the appended claims.

I claim:
1. In an apparatus for the conversion of hydrocarbon oils, a vertical tube heater disposed within a furnace, means for producing hot combustion gases for heating said vertical tube heater substantially entirely by radiant heat, a vertical tube soaker outside and adjacent the furnace, a preheating chamber connected to said combustion chamber and having heat-absorbing tubes therein for preheating the fluid, means for circulating a regulated portion of flue gases directly from the furnace, after passing in radiative heat exchange relation with said vertical tube heater and before passing through the preheating chamber, in contact with the soaker section to heat the same substantially entirely by convection, means for conducting the remaining portion of the gases, after passing in radiative heat exchange relation with said vertical tube heater, directly from said furnace into the preheating chamber without coming in contact with said soaker section, an air preheater for receiving only that portion of the gases which has passed through the preheating chamber to preheat air passing therethrough, means for conducting the thus preheated air to said combustion chamber, a conduit for removing gases from said soaker section and a fan in said conduit to regulate the amount of gases circulated directly from the furnace to said soaker section.

2. In an apparatus for the conversion of hydrocarbon oils, a vertical tube heater disposed within a furnace, means for producing hot combustion gases for heating said vertical tube heater substantially entirely by radiant heat, a vertical tube soaker outside and adjacent the furnace, a preheating chamber connected to said combustion chamber and having heat-absorbing tubes therein for preheating the fluid, means for circulating a regulated portion of flue gases directly from the furnace, after passing in radiative heat exchange relation with said vertical tube heater and before passing through the preheating chamber, in contact with the soaker section to heat the same substantially entirely by convection, means for conducting the remaining portion of the gases, after passing in radiative heat exchange relation with said vertical tube heater, directly from said furnace into the preheating chamber without coming in contact with said soaker section, an air preheater preheated by waste gases, means for conducting preheated air to said combustion chamber, a conduit for removing gases from said soaker section and a fan in said conduit to regulate the amount of gases circulated directly from the furnace to said soaker section.

LUIS DE FLOREZ.